United States Patent [19]
Yamauchi et al.

[11] Patent Number: 6,090,344
[45] Date of Patent: Jul. 18, 2000

[54] METHOD AND SYSTEM FOR GENERATING SCENT FROM INDEPENDENTLY RELEASABLE SOURCES OF SCENT CAUSING AGENTS

[75] Inventors: Satoshi Yamauchi, Kanagawa; Noboru Murayama, Machida, both of Japan

[73] Assignee: Ricoh Company, Ltd., Japan

[21] Appl. No.: 09/111,609

[22] Filed: Jul. 7, 1998

[30] Foreign Application Priority Data

Jul. 7, 1997 [JP] Japan ................................. 9-181611
Jul. 7, 1997 [JP] Japan ................................. 9-181612

[51] Int. Cl.⁷ .................................................. A61L 9/00
[52] U.S. Cl. ............................. 422/4; 422/5; 422/120; 422/123; 422/305; 422/306; 352/85; 352/91 R; 352/131; 352/244; 352/38; 396/429; 396/439; 396/661
[58] Field of Search .................... 422/4, 5, 120, 422/123–125, 305, 306, 307; 352/85, 91 R, 131, 244, 38; 396/429, 439, 661

[56] References Cited

U.S. PATENT DOCUMENTS

| | | |
|---|---|---|
| 4,603,030 | 7/1986 | McCarthy ............................ 422/124 |
| 4,905,112 | 2/1990 | Rhodes ................................ 422/124 |
| 5,069,876 | 12/1991 | Oshinsky ................................ 422/4 |
| 5,565,148 | 10/1996 | Pendergrass, Jr. .................... 422/124 |
| 5,734,590 | 3/1998 | Tebbe ............................... 364/400.01 |

FOREIGN PATENT DOCUMENTS

| | | |
|---|---|---|
| 64-75284 | 3/1989 | Japan . |
| 1-267087 | 10/1989 | Japan . |
| 8-336576 | 12/1996 | Japan . |
| 9-30127 | 2/1997 | Japan . |
| 9-70426 | 3/1997 | Japan . |

Primary Examiner—Terrence R. Till
Assistant Examiner—Fariborz Moazzam
Attorney, Agent, or Firm—Knoble & Yoshida LLC

[57] ABSTRACT

The system for and a method of generating a scent and an image based upon a coded signal transmitted from a remote location, and the scent is generated from a dry scent carrying medium which contains a plurality of independent sources of scent causing agents. The coded signal is indicative of simultaneously activating the independent sources of scent causing agents so as to generated a complex mixture of the scents on the fly.

51 Claims, 17 Drawing Sheets

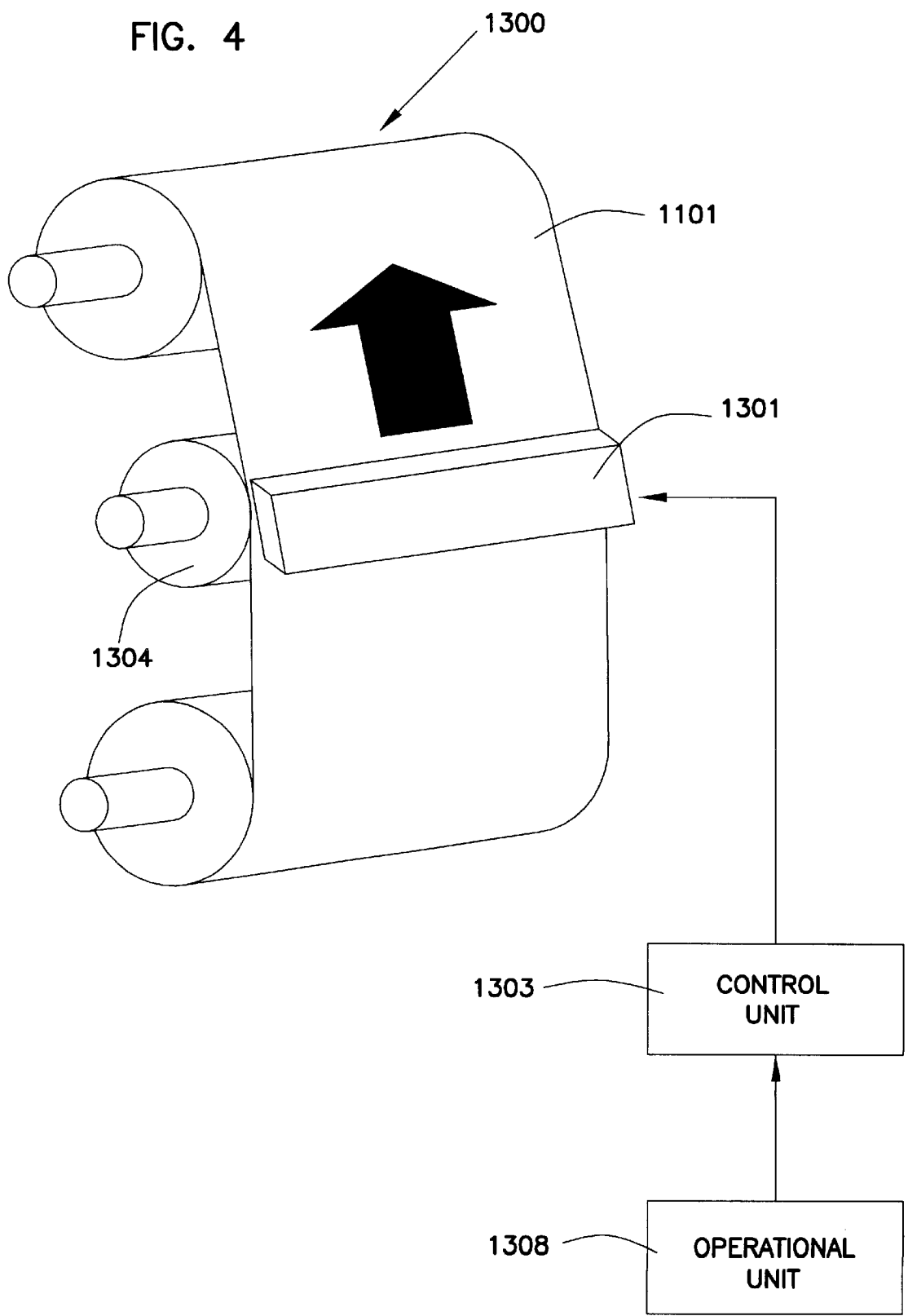

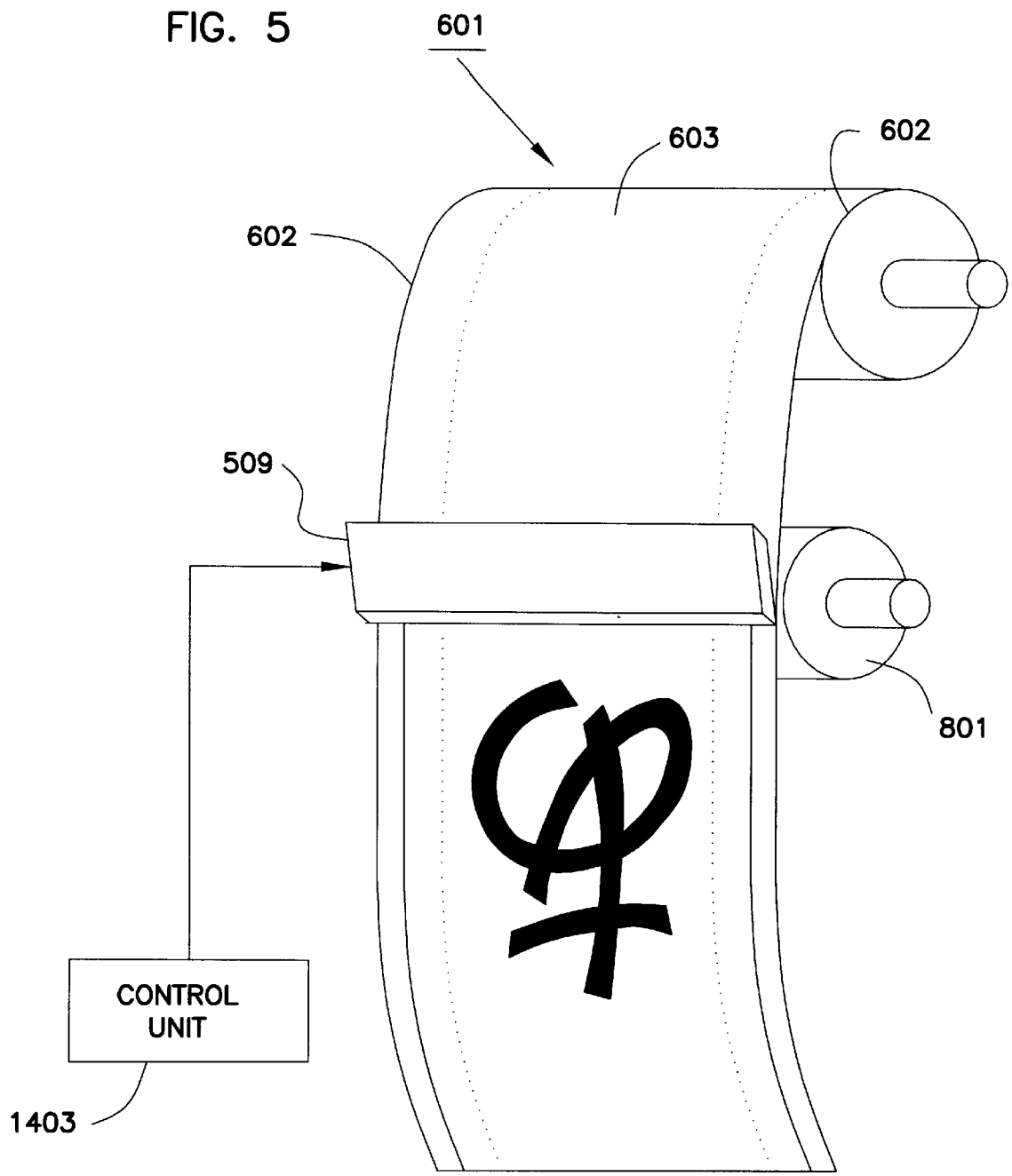

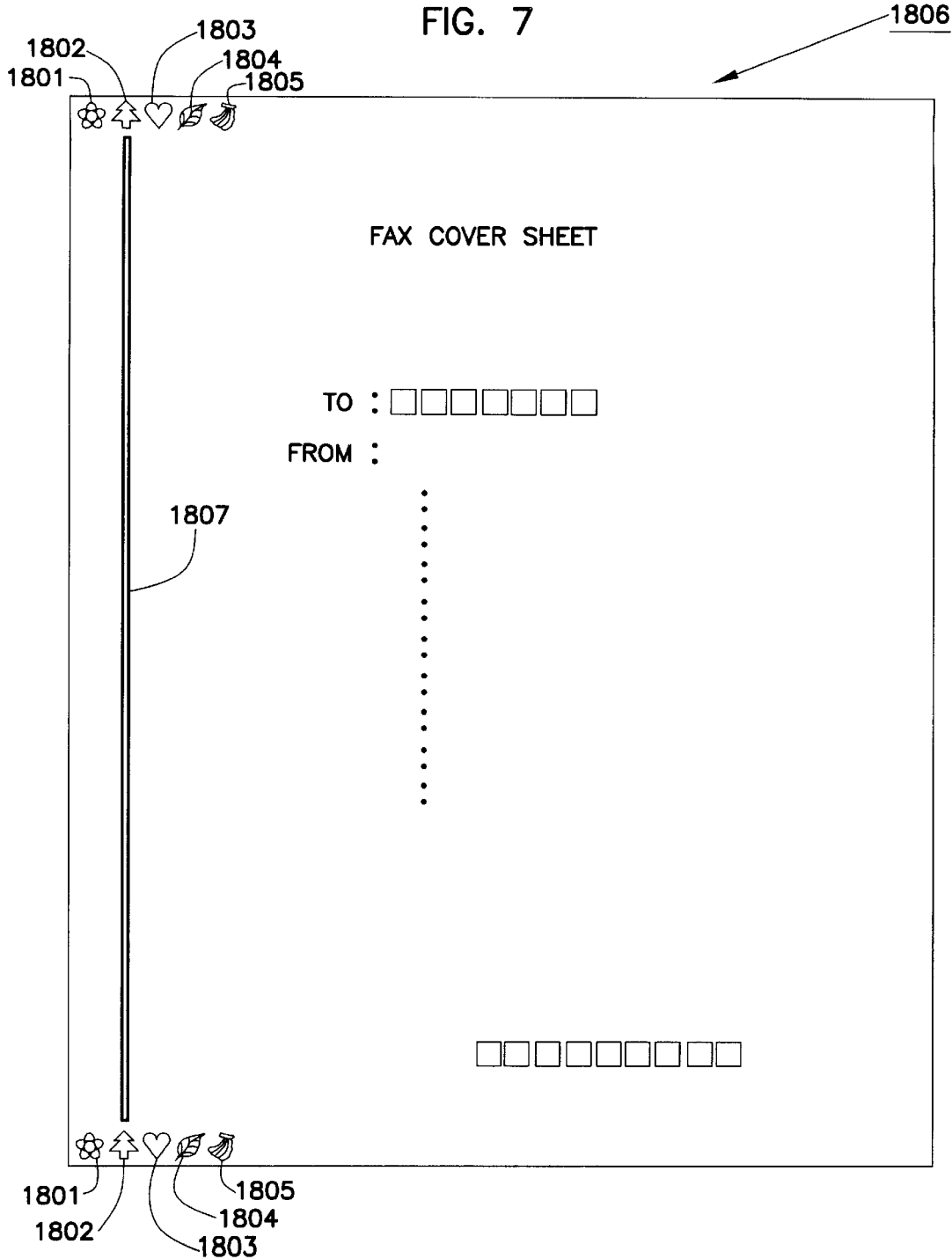

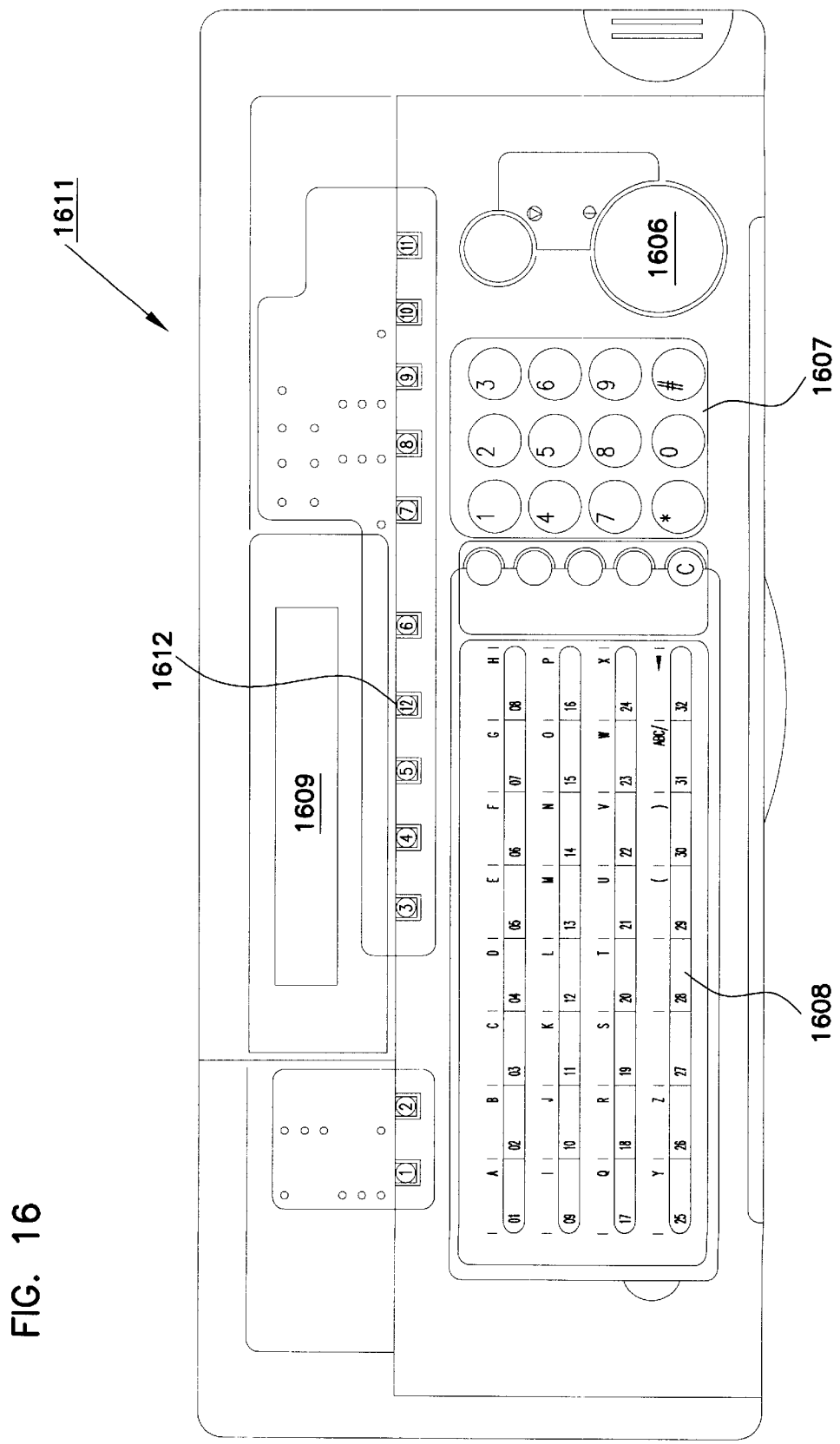

FIG. 17A

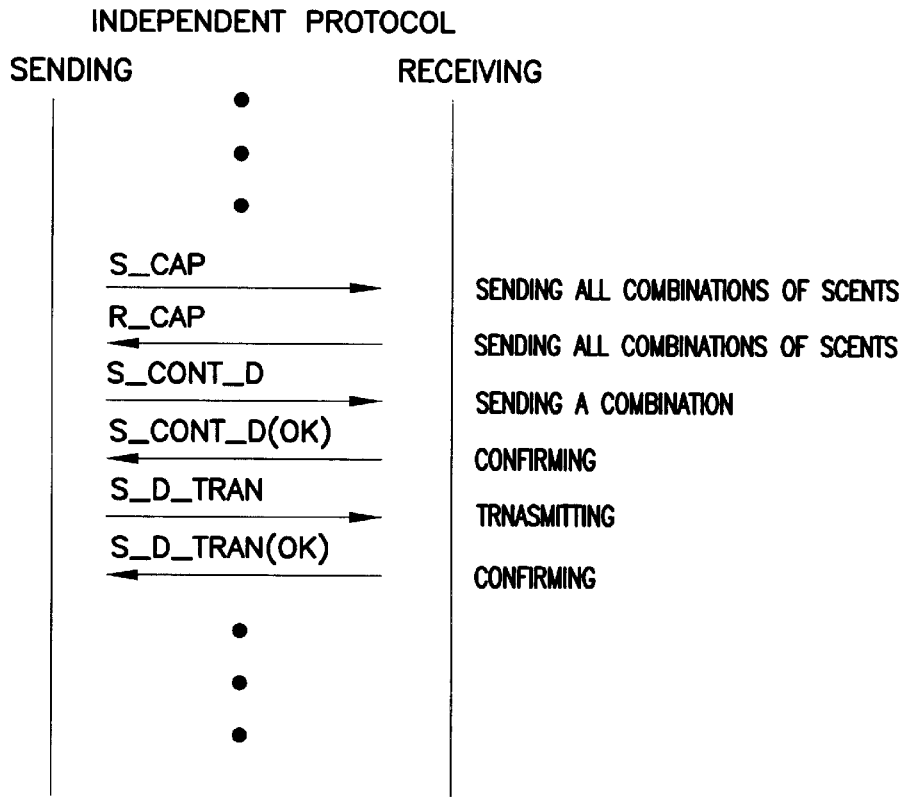

FIG. 17B

| 1st & 2nd Byte | COMMAND NAME (S_CAP_ or R_CAP) |
|---|---|
| 3rd Byte and every bit | Specifying Scent Generation Device Support<br>Thermal Capsule<br>Mechanical Release<br>Ink Jet<br>Carlson Copier<br>•<br>•<br>•<br>5 Scent Combinations Type<br>30 Scent Combinations Type<br>3 Scent Combinations Type<br>12 Scent Combinations Type<br>24 Scent Combinations Type<br>48 Scent Combinations Type |

FIG. 18A    G3 FAX PROTOCOL
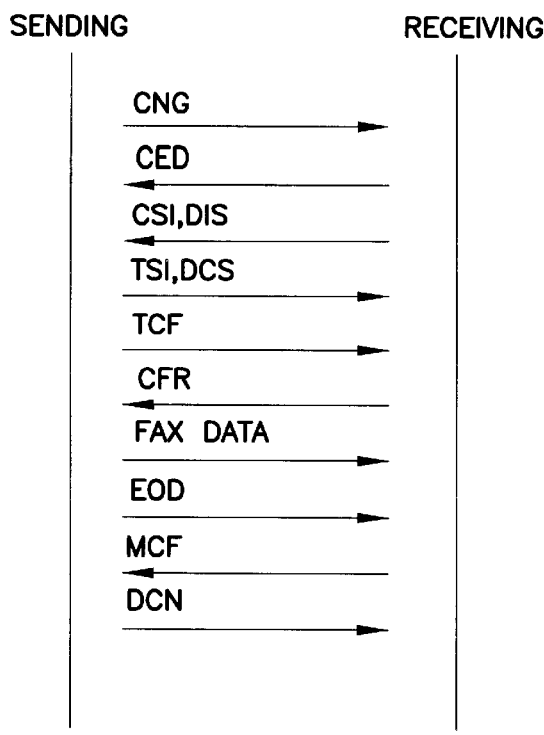
FIG. 18B    G4 FAX PROTOCOL
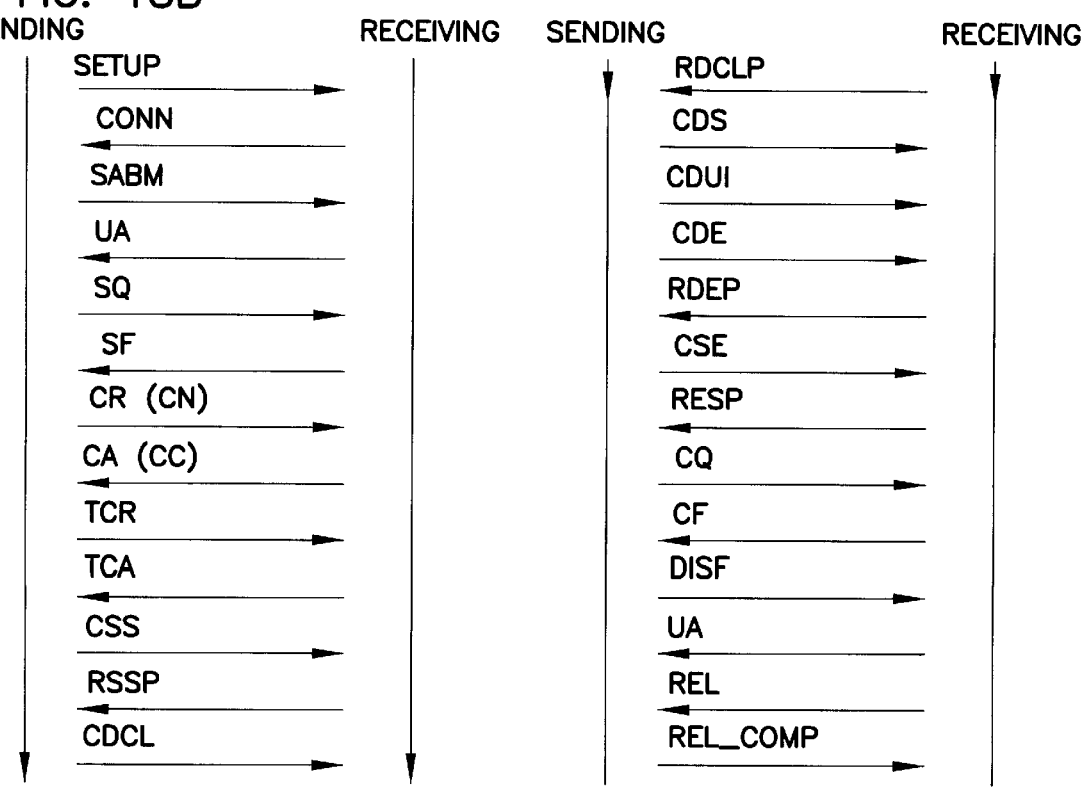

METHOD AND SYSTEM FOR GENERATING SCENT FROM INDEPENDENTLY RELEASABLE SOURCES OF SCENT CAUSING AGENTS

FIELD OF THE INVENTION

The current invention is generally related to a system and a method of generating a scent and an image based upon a coded signal transmitted from a remote location, and more particularly related to a system and a method of generating a scent from a dry scent carrying medium which contains a plurality of independent sources of scent causing agents.

BACKGROUND OF THE INVENTION

Olfactory stimuli affect us in different ways. For example, some types of scent refresh our feelings while others nauseate us. To take advantage of a pleasant scent, products such as perfume and air refreshers are readily available. On the other hand, to control or contain an unpleasant scent, an odor eliminating agent such as ammonia is used.

In order to enrich our daily lives, prior art in scent generation includes a scent generation device such as disclosed in Japanese Patent Laid Publication Hei 8-336576 converts scent causing particles into a gaseous state from its original liquid state and releases them in the air. It has been also known that a generated scent is released via an air conditioning system or into air ducts for an efficient circulation.

The idea of using a scent-causing agent in combination with office equipment has been also disclosed in prior art. For example, Japanese Patent Laid Publication Hei 9-70426 discloses the use of a scent-causing agent in combination with a computer display unit. The relevant prior art also combined the scent generation with printing devices as well as facsimile machines. In other words, the scent generation is combined with the image generation or image output. In one facsimile application, a predetermined scent is generated during the image formation upon a receiving facsimile transmission so as to notify a user as disclosed in Japanese Patent Laid Application 64-75284. The heat-sensitive scent causing agent is initially provided on an image carrying medium, and the scent causing agent is released during the thermal image formation.

Another example of prior art scent generation is related to the use of a predetermined scent and a corresponding predetermined color in an output image. For example, Japanese Patent Laid Publication Hei 1-267087 discloses a thermally sensitive image carrying medium which contains predetermined scent causing agents placed in a certain colorant layer. During an image formation process, when a certain colorant is used, the associated scent causing agents are released into air. Although it is suggested in the disclosure that different types of scent causing agents is mixed, the mixture is fixedly mixed in a certain colorant layer in the image carrying medium.

In the relevant prior art of thermal transfer image formation, scent causing agents are initially stored in colorant. For example, Japanese Patent Laid Publication Hei 9-30127 discloses that scent causing agents are encapsulated by a heat resistant shield and placed in a predetermined ink layer. During the thermal colorant transfer, a colorant and the associated encapsulated scent causing agents are transferred onto an image carrying medium while the scent causing agents are contained in the heat shielding capsules. In other words, the scent is not released during the image formation, but the scent is later activated by pressing the transferred colorant surface. The pressure breaks the capsule and releases the scent causing agents contained therein.

The above described relevant prior art is generally directed to generating a predetermined and fixed scent. The current invention is generally directed at scent generation on the fly so as to allow a more flexible scent generation process.

SUMMARY OF THE INVENTION

In order to solve the above and other problems, according to a first aspect of the current invention, an image-carrying medium having a first side, a second side and edges, includes: an image-carrying area for carrying an image; and a plurality of independent sources of scent-causing agents, each of the independent sources being independently activated for generating a predetermined scent.

According to a second aspect of the current invention, a system for generating a scent, includes: a scent control unit for generating a scent signal which specifies a scent to be generated; a dry scent-carrying medium for carrying a plurality of independently releasable sources of scent-causing agents, each of the sources causing a predetermined scent; and a scent causing unit located near the dry scent-carrying medium and in response to the scent signal from the scent control unit for selectively releasing the scent-causing agents from the dry scent-carrying medium so as to generate the scent.

According to a third aspect of the current invention, a facsimile for transmitting an image and a scent, includes: an image control unit for generating an image signal which specifies the image to be transmitted; a scent control unit for generating a scent signal which specifies the scent to be transmitted; an output-carrying medium for carrying an image and a plurality of independently releasable sources of scent-causing agents, each of the sources causing a predetermined scent; and an output unit located near the output-carrying medium and in response to the scent signal and the image signal for generating the image and for selectively releasing the scent-causing agents from the output-carrying medium so as to generate the scent.

According to a fourth aspect of the current invention, a method of generating a scent from an image-carrying medium, the image-carrying medium having a first side, a second side and edges, the first side further including an image-carrying area, includes the steps of:
providing a plurality of independent sources of scent-causing agents with the image-carrying medium, each of the independent sources being independently activated for generating a predetermined scent; rendering an image on the first side; and selectively releasing the scent-causing agents so as to generate the scent.

According to a fifth aspect of the current invention, a method of generating a scent, includes the steps of: generating a scent signal which specifies the scent to be generated; providing a plurality of independently releasable sources of scent-causing agents with a dry scent-carrying medium, each of the sources causing a predetermined scent; and selectively releasing the scent-causing agents from the dry scent-carrying medium based upon the scent signal so as to generate the scent.

According to a sixth aspect of the current invention, a method of transmitting an image and a scent, including: generating an image signal which specifies the image to be transmitted; generating a scent signal which specifies the scent to be transmitted; providing an output-carrying medium which carries an image and a plurality of independently releasable sources of scent-causing agents, each of the sources causing a predetermined scent; generating the image in response to the image signal; and selectively releasing the scent-causing agents from the output-carrying medium so as to generate the scent in response to the scent signal.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 further illustrates one example of the scent activation sub-system of the scent generation system according to the current invention.

FIG. 5 further illustrates another example of the scent activation sub-system of the scent generation system according to the current invention.

FIG. 7 illustrates one example of a source document for specifying a scent to be generated by the scent generation system according to the current invention.

FIG. 16 illustrates another exemplary layout of a scent input unit for the facsimile scent transmission system according to the current invention.

FIGS. 17A and 17B respectively illustrate a scent generation related protocol and a format in the protocol used by the scent generation system according to the current invention.

FIGS. 18A and 18B respectively illustrate the G3 and G4 facsimile transmission protocols.

DETAILED DESCRIPTION OF THE PREFERRED EMBODIMENT(S)

Figure 1:
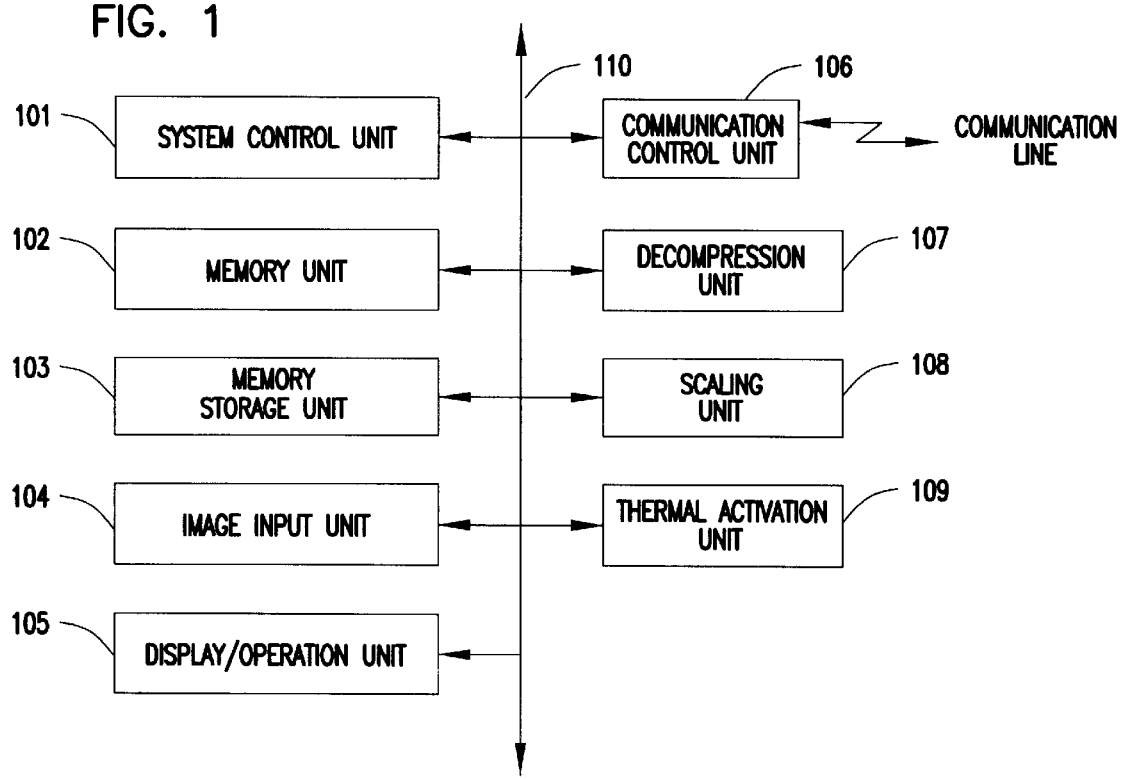
FIG. 1 is a block diagram illustrating one preferred embodiment of the scent and image generation system according to the current invention.

Referring now to the drawings, wherein like reference numerals designate corresponding structure throughout the views, and referring in particular to FIG. 1, a block diagram illustrates one preferred embodiment of the scent and image generation system according to the current invention. The preferred embodiment of the scent and image generation system includes a system control unit 101; a memory unit 102 such as a random access memory (RAM); a memory storage unit 103 such as a hard disk/drive; an image input unit 104 such as a scanner; a display/operation unit 105; a communication control unit 106 connected to a communication line such as a telephone line; a decompression unit 107 for decompressing received compressed data; a scaling unit 108; and a thermal activation unit 109. All of the above units are connected via a bus 110.

Still referring to FIG. 1, image and or scent data is inputted into the image and scent generation system. One data input path includes the communication control unit 106 via the communication line. If the inputted data is compressed for data transmission, the decompression unit 107 decompresses the data prior to further processing. Another data input path involves the display/operation unit 105. Image data is also inputted via the scanner 104. Yet another data input path involves the memory storage unit 103 where data is previously stored. The data then resides in the memory unit 102, and the system control unit 101 controls the thermal activation unit 109 according to the data. The thermal activation unit 109 includes a thermal unit such as a thermal head for heat activating a heat sensitive medium. For scent generation, the heat-sensitive medium is treated or provided with scent causing agents. For image generation, the heat sensitive medium is treated or provided with image forming agents such as thermally responsive colorant.

Figure 2:
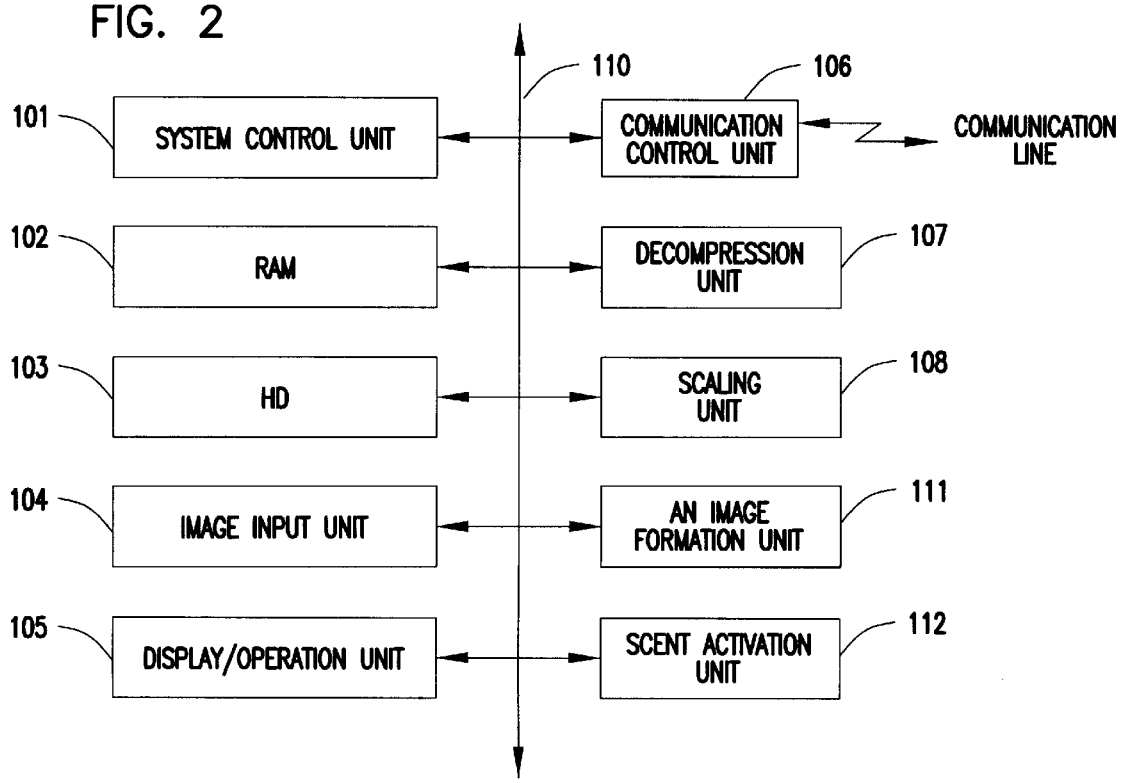
FIG. 2 is a block diagram illustrating a second preferred embodiment of the scent and image generation system according to the current invention.

Now referring to FIG. 2, a second preferred embodiment of the image and scent generation system according to the current invention includes units that are substantially identical to those of the first embodiments as illustrated in FIG. 1 except for an image formation unit 111 and a scent activation unit or a scent causing unit 112. The description of the substantially identical units are therefore not repeated. In the second embodiments, the image formation unit 111 and the scent activation unit 112 are separate, and they respectively generate an image and a scent. The scent activation unit 112 is either thermally or mechanically activating the scent-causing agent. In case of the heat activation, the scent activation unit 112 heats a scent carrying medium so that scent causing agents provided therein are released. On the other hand, in case of mechanical activation, the scent activation unit 112 generates pressure and applies it against a scent carrying medium so that capsules containing scent causing agents are broken. The image formation unit 111 is either thermally activating colorant on an image carrying medium or depositing colorant onto an image carrying medium.

Figure 3:
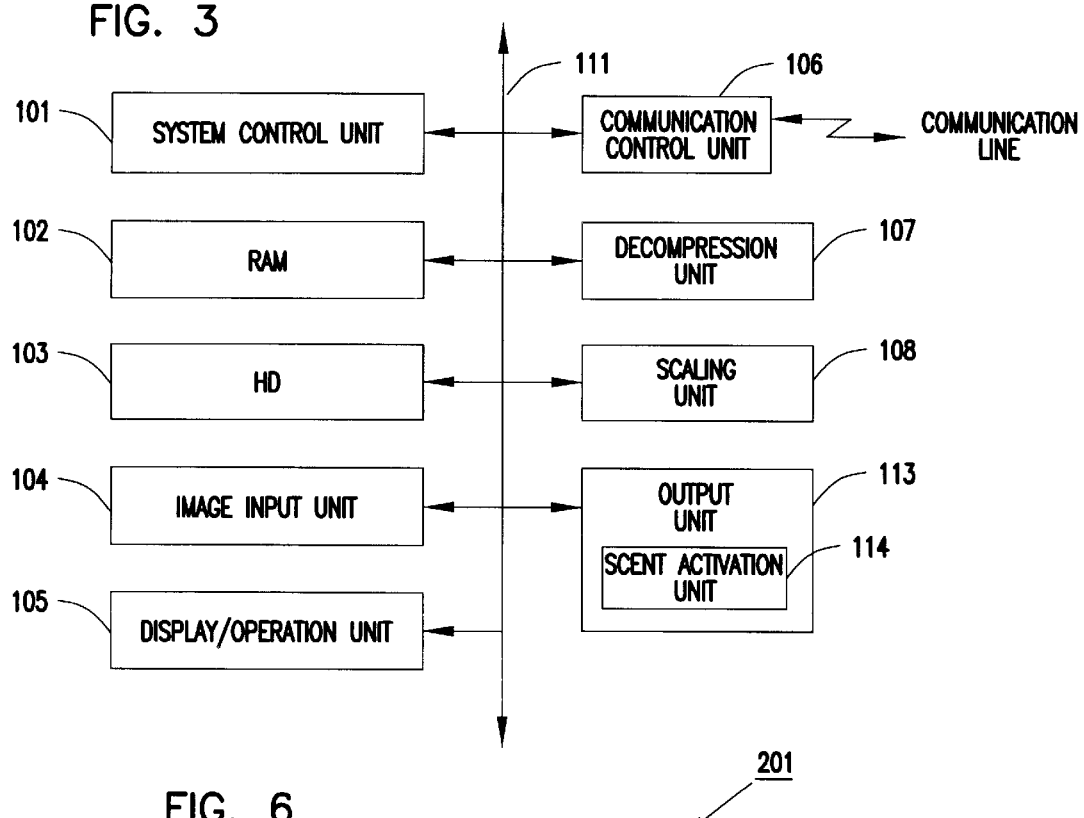
FIG. 3 is a block diagram illustrating a third preferred embodiment of the scent and image generation system according to the current invention.

Now referring to FIG. 3, an alternative embodiment of the image and scent generation system according to the current invention includes units that are substantially identical to those of the second embodiments as illustrated in FIG. 2 except for an output unit 113 and a scent activation unit or a scent causing unit 114. The description of the substantially identical units are therefore not repeated. The output unit 113 generates any combination of an image and a scent. In the alternative embodiments, the output unit 114 further includes the scent causing unit 114, and the scent activation unit 114 generates a scent. The scent activation unit 114 is either thermally or mechanically activating the scent-causing agent. In the alternative, the scent activation unit 114 is an ink jet type head for releasing a scent with or without depositing colorant onto an image-carrying medium. In other words, the output unit 113 and the system control unit 101 control the release of the scent according to scent data. The scent activation unit 114 may include a plurality of ink jet type heads for generating a combination from independent sources of scent by simultaneously activating multiple ink jet type heads.

Now referring to FIG. 4, to further illustrate the scent generation, a thermal sub system 1300 including the control of a thermal activation unit or a thermal head 1301 is described. The thermal head 1301 is located in contact with or in the close vicinity of thermal sensitive medium 1101 opposite a platen roller 1304. The thermal sensitive medium 1101 is fed from one feeding roller to another retrieving roller as indicated by a solid arrow. As the thermal medium 1101 moves, a thermal control unit 1303 selectively activates a certain portion of the thermal head 1301 based upon scent data which is fed from one of input signal sources such as an operational control unit 1308. The thermal sensitive medium 1101 is a flexible dry sheet which has been treated or provided with a plurality of independently releasable sources of scent causing agents. In other words, each source containing a certain type of scent causing agents are coated on a predetermined size portion of the surface or imbedded in a predetermined layer. When the thermal head 1301 selectively heats a portion of the heat sensitive medium 1101, the corresponding scent causing agents in the selectively heated portion are released.

Still referring to FIG. 4, the control unit 1303 receives a scent generation signal which is indicative of simultaneously activating multiple independent sources of the scent causing agents. In response to the scent generation signal, the control unit 1303 in turn activates corresponding portions of the thermal head 1301 so as to heat the multiple areas where independent sources of the scent causing agents are contained. Some exemplary organizations of the independent sources include separate strips of scent causing agents along the moving direction of the medium 1101 as well as separate strips perpendicular to the moving direction of the medium 1101. Simultaneous release of multiple scent causing agents generates a mixture of odors that is different from any single source.

Now referring to FIG. 5, another embodiment of the scent generation system according to the current invention outputs both an image and a scent. An output unit 509 is located in contact with or in the vicinity of an output carrying medium 601 opposite a platen roller 801. The output carrying medium 601 is fed into the output unit 509 as shown by an arrow from a feeding roller 602. One example of the output carrying medium 601 includes an image carrying area 603 as well as scent carrying area 602 on the same side of the output carrying medium 601. The image carrying area 603 is a surface which is capable of carrying an image. The scent carrying area 602 is located adjacent to the image carrying area 603 along an edge of the output carrying medium 601 and each contains a plurality of independent sources of scent causing agents. In order to generate an image-scent output, a control unit 1403 further includes an image control unit for generating an image signal and a scent control unit for generating a scent signal and sends these signals to an output unit 509. Based upon the image signal and the scent signal, the output unit 509 activates the corresponding areas of the output carrying medium 601 for generating an image of a Japanese character as shown in the image carrying area 603 and a scent.

Still referring to FIG. 5, the output unit 509 and the output carrying medium 601 are implemented in various manners. One implementation of the output unit 509 is a thermal unit which thermally activates the heat sensitive output carrying medium 601. In this implementation, the output carrying medium 601 contains both heat sensitive colorant which becomes visible on the output medium surface as well as heat activated scent causing agent which is released in the air in response to heat application. In another implementation, the output unit 509 deposits colorant onto the output medium 601 for generating an image as well as releases scent causing agents in the air. In yet another implementation, the output unit 509 generates pressure to be applied to a pressure sensitive output carrying medium 601 so that scent causing agents are released from the output image medium 601. The pressure sensitive output carrying medium contains pressure sensitive capsules which encapsulates scent causing agents. A combination of the above described implementations for the output unit 509 and the output carrying medium is also practiced according to the current invention.

Figure 6:
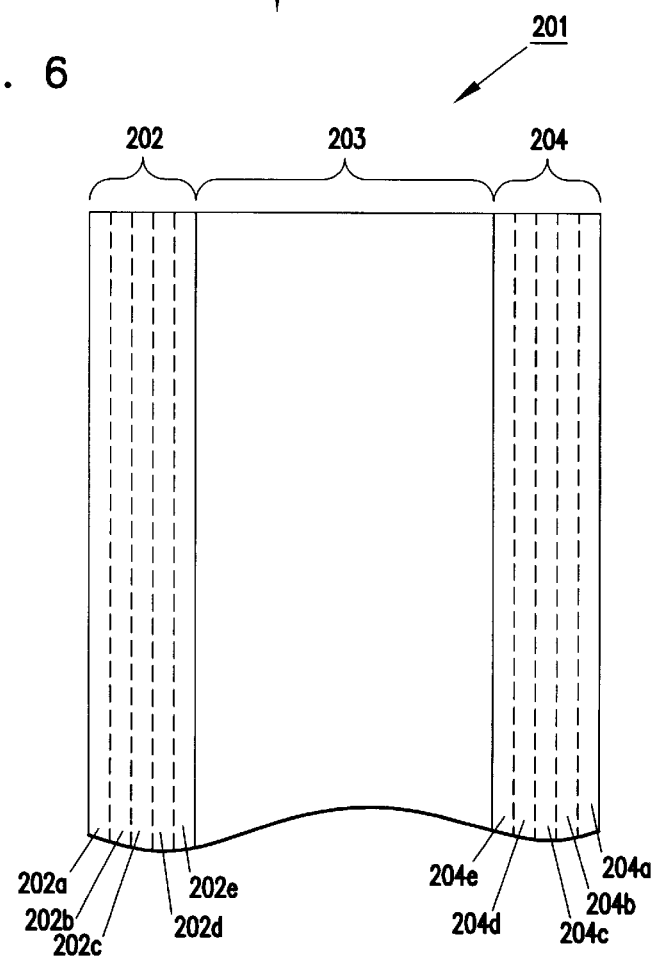
FIG. 6 diagrammatically illustrates one example of the scent carrying medium of the scent generation system according to the current invention.

Now referring to FIG. 6, some details of one exemplary output carrying medium 201 are illustrated. The output medium 201 includes an image surface area 203 where an image is formed, a first scent carrying area 202 and a second scent carrying area 204. Both scent carrying areas 202 and 204 are located along an edge of the output carrying medium 201. The first scent carrying area 202 is further divided into five sub-areas 202a through 202e along the length of the output medium 201. Similarly, the second scent carrying area 204 is also sub-divided into five sub-areas 204a through 204e. Each of the sub-areas 202a through 202e and 204a through 204e is independently activated for releasing its scent causing agents, and each sub area may contain scent causing agents for a distinct scent. With n independent sources of scent causing agents, a combination of simultaneously activated sources generates a total of $2^n-1$ kinds of scents. Other examples of the output carrying medium include a scent carrying area on a opposite side of an image carrying area. The scent carrying area does not need to be along the edge and can be anywhere and any size in the output medium. The scent carrying area and the image carrying area is either thermal or pressure sensitive. Alternatively, the image carrying area is plain paper where colorant is deposited.

FIG. 7 illustrates an example of a fax cover sheet 1806 which contains information specifying a scent to be generated at a receiving location. In addition to information such as a sender and a receiver, the fax cover sheet 1806 includes a series of marks 1801 through 1805 for each indicating a predetermined scent to be generated at a receiving location. In this example, the marks include a flower mark 1801 for indicating a predetermined floral scent, a tree mark 1802 for indicating a predetermined forest scent, a heart 1803 for indicating a predetermined perfume scent, a leaf 1804 for indicating a predetermined leaf scent and a banana mark 1805 for indicating a predetermined banana scent. In this example, a tree scent is selected by placing a solid line 1807 between the two tree marks 1802.

Figure 8A:
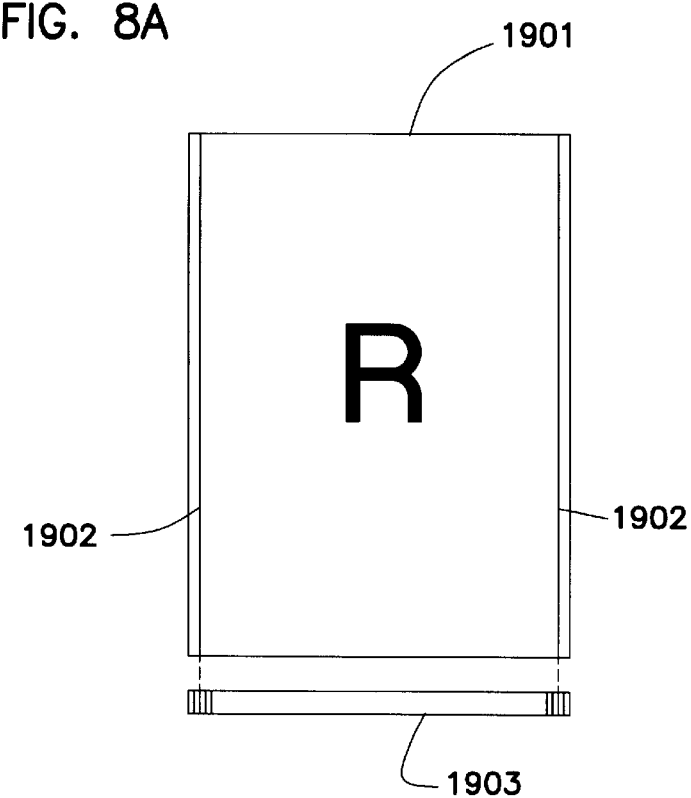
FIGS. 8A and 8B respectively illustrate an input document for specifying a scent to be generated and an output carrying medium which is used by the scent generation system according to the current invention.
Figure 8B:
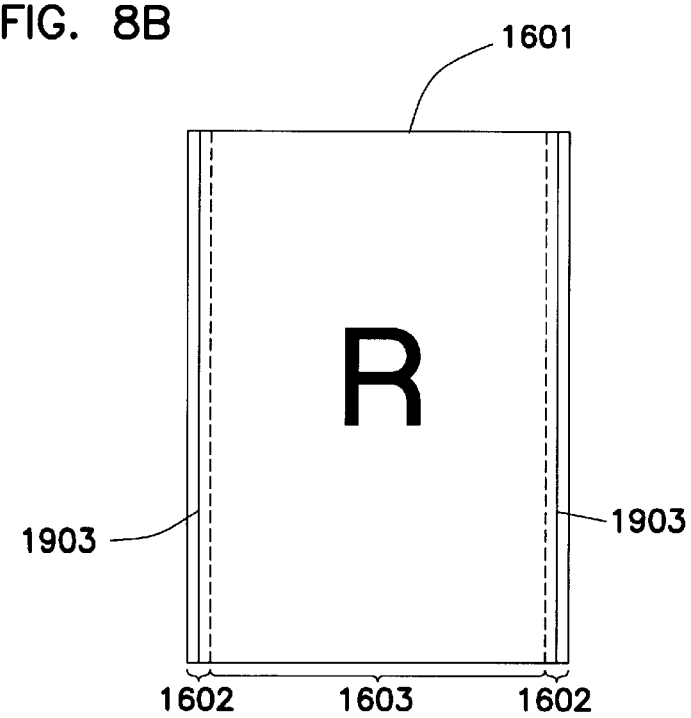

To further illustrate the transmission of the selected scent information and the generation of the selected scent at a receiving location, FIGS. 8A and 8B are respectively an original fax sheet 1901 at a source location and an output fax sheet 1601 at a destination location. The original fax sheet 1901 includes image data including letter "R" and scent data 1902 whose line position indicates a predetermined scent to be generated. The output sheet 1601 includes an image area 1603 for forming an image according to the image data and scent areas 1602 for generating a scent according to the scent data. The image area 1603 is capable of carrying colorant which is to be deposited thereon according to the image data or is capable of forming image via heat sensitive colorant therein. The scent areas 1602 is capable of releasing scent causing agents provided therein or thereon according to the scent data. The release of desired scent causing agents is accomplished by applying heat or pressure in a sub-area indicated by lines 1903. In this exemplary output sheet 1601, the scent areas 1602 is also capable of forming an image as illustrated by the lines 1903.

Figure 9A:
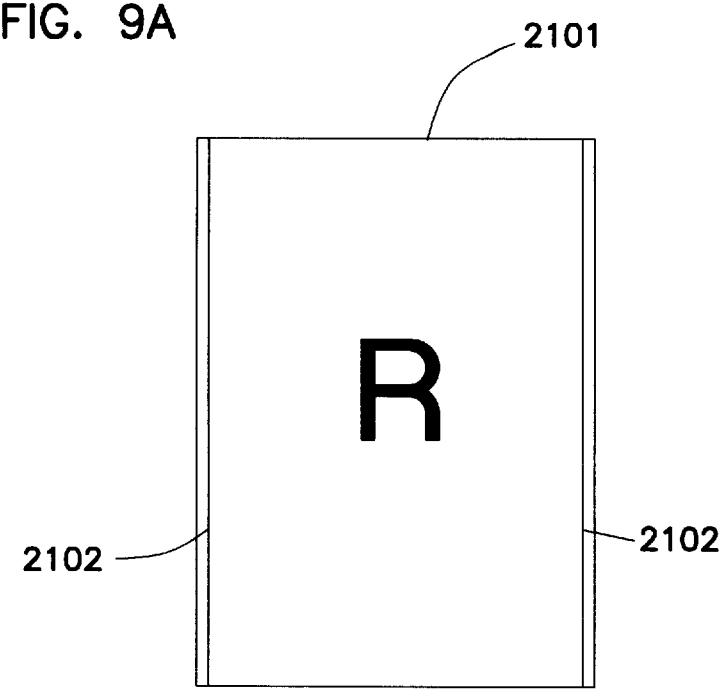
FIGS. 9A and 9B respectively illustrate another exemplary input document for specifying a scent to be generated and another output carrying medium which is used by the scent generation system according to the current invention.
Figure 9B:
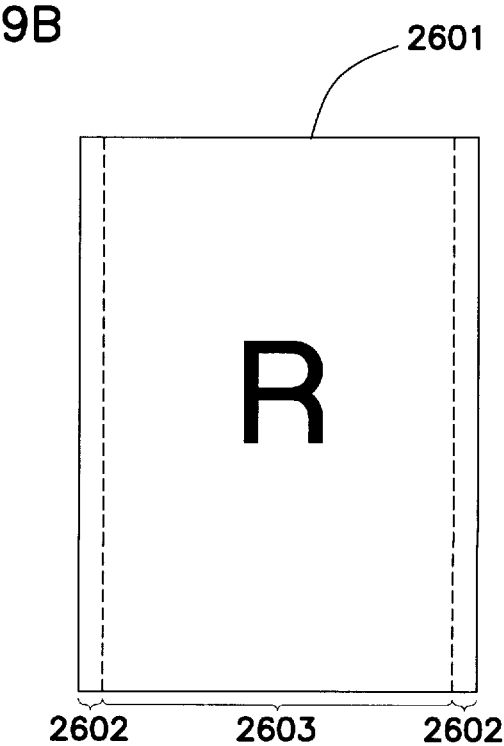

FIGS. 9A and 9B are respectively an original fax sheet 2101 at a source location and an output sheet 2601 at a destination location. The original fax sheet 2101 includes image data including letter "R" and scent data 2102 whose line position indicates a predetermined scent to be generated. The output sheet 2601 includes an image area 2603 for forming an image according to the image data and scent areas 2602 for generating a scent according to the scent data. The image area 2603 is capable of carrying colorant which is to be deposited thereon according to the image data or is capable of forming image via heat sensitive colorant therein. The scent areas 2602 is capable of releasing scent causing agents provided therein or thereon according to the scent data. The release of desired scent causing agents is accomplished by applying heat or pressure in a corresponding sub-area. In this exemplary output sheet 2601, the scent areas 2602 is not capable of forming an image for eliminating undesired lines. One implementation of the scent areas 2602 lacks heat sensitive colorant.

Figure 10A:
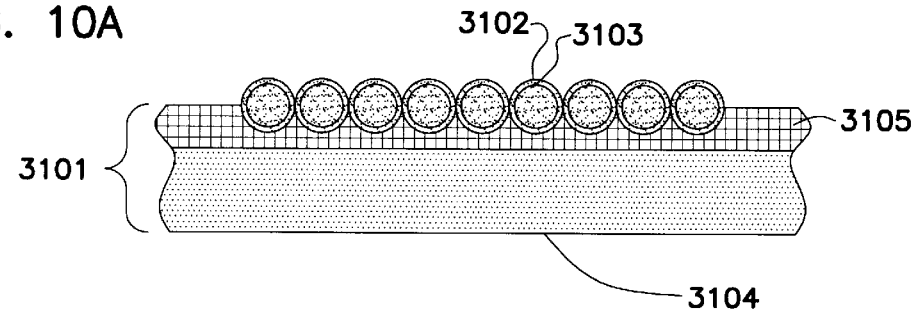
FIGS. 10A and 10B respectively illustrate a cross sectional view and a top view of one preferred embodiment of the output carrying medium according to the current invention.

One embodiment of the output sheet or output medium according to the current invention is illustrated in FIGS. 10 through 12. In general, the output medium is scent and or image carrying medium for forming an image and or generating a scent in response to an image signal and a scent signal. Referring to FIG. 10 in particular, a scent only carrying medium 3101 includes scent causing agent 3101 which is encapsulated in capsule 3102, binder 3105 which binds the encapsulated scent causing agent 3102 over a base layer or sheet 3104. The base sheet 3104 is either paper, cloth or polyester. The capsule 3102 is made of heat sensitive material which is breaks or dissolved at a predetermined temperature so as to release the scent causing agent 3103. Each of the capsules 3102 contains a predetermined scent causing agent 3103.

Figure 10B:
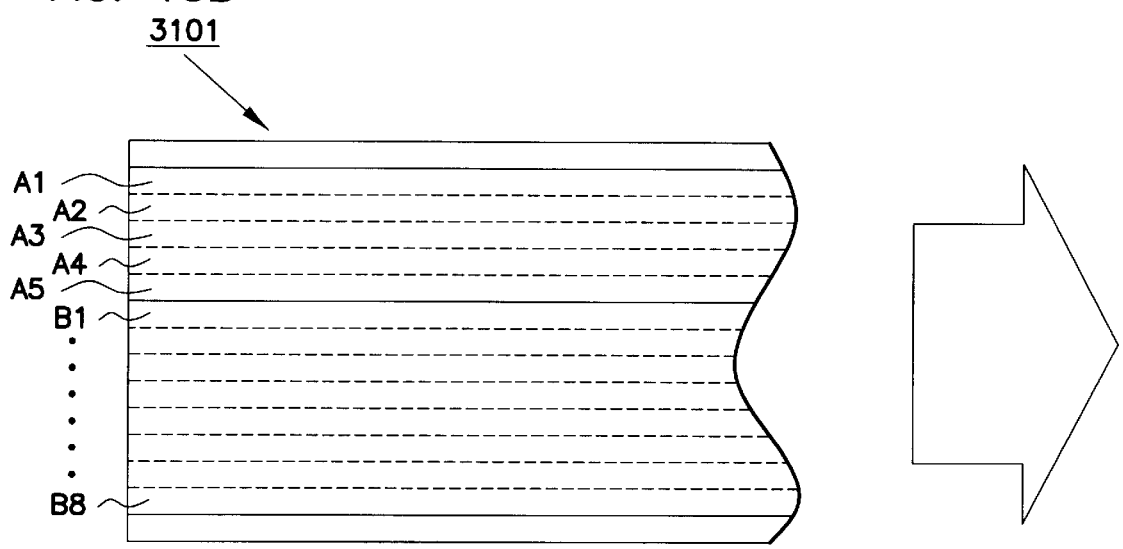

Referring to FIG. 10B, a top view illustrates one example of the above described scent only carrying medium 3101. The capsules A1 through A5 and B1 and B8 each containing a scent causing agent are placed in a array along the length of the scent carrying medium 3101. In this example, the capsules A1 through A5 each contain a primary or elementary scent which is combined with others to generate a desired scent. On the other hand, the capsules B1 through B8 each contain a specific scent which emits an independently recognizable scent without mixing with any other scent causing agents. For example, the capsules B1 through B8 contain a banana scent, a pineapple scent and a lemon scent.

Figure 11A:
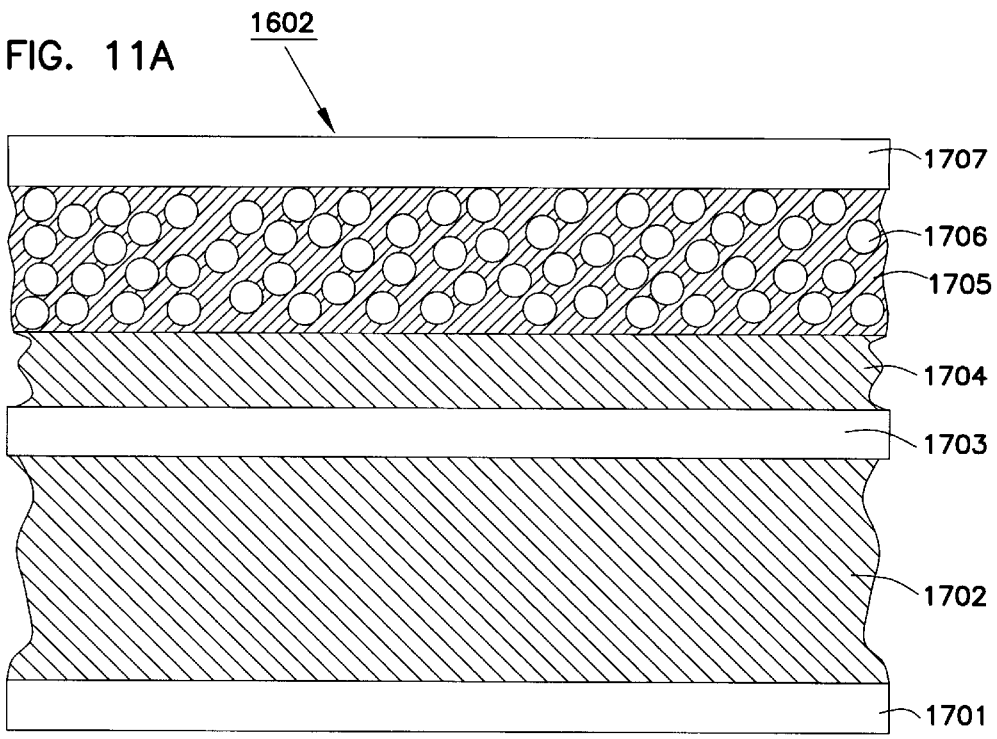
FIGS. 11A and 11B respectively illustrate a cross sectional view and a top view of another preferred embodiment of the output carrying medium according to the current invention.
Figure 11B:
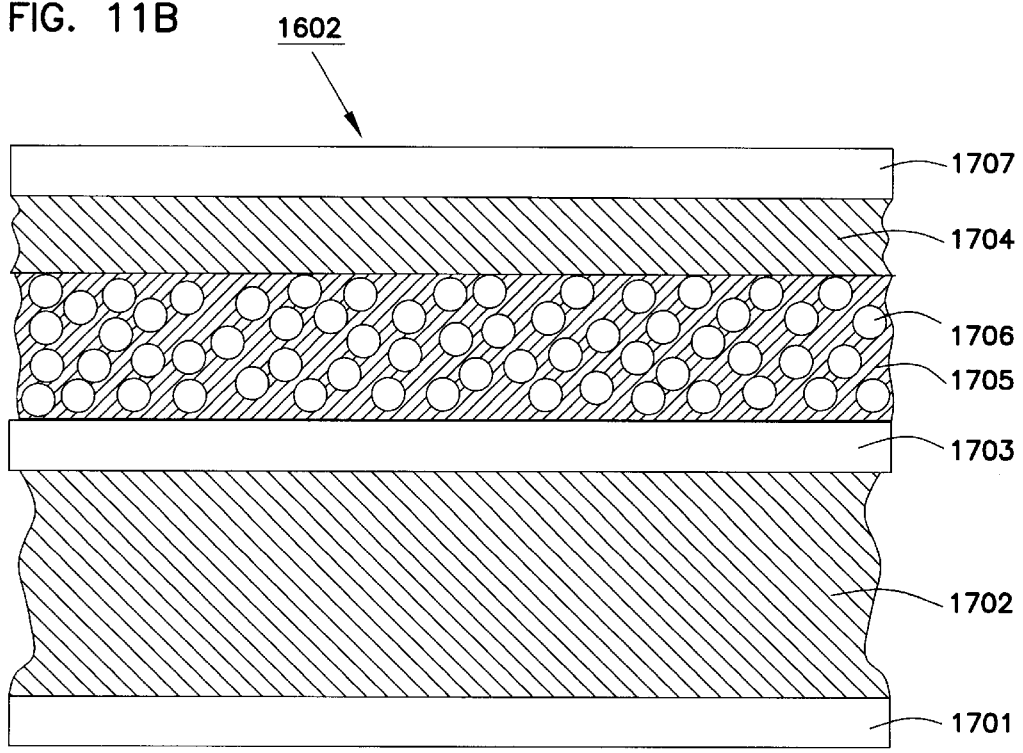

Now referring to FIGS. 11A and 11B, a cross sectional view illustrates two embodiment of scent and image carrying medium according to the current invention for forming an image and or generating a scent in response to an image signal and a scent signal. In particular, referring to FIG. 11A, one preferred embodiment includes the following layers from the top to the bottom. The top layer is placed in contact with or in the vicinity of a thermal activation unit. A top scent leakage prevention layer 1707 prevents scent causing agent from releasing prior to heat activation. However, upon heat exposure, the top scent leakage prevention layer 1707 Located underneath the top scent leakage prevention layer 1707 is a binder layer 1705 which holds scent causing agents 1706. A heat sensitive colorant layer 1704 is located under the binder layer 1705 and forms an image in response to heat. To stabilize the above described layers, a rear prevention layer 1703 is located below the heat sensitive colorant layer 1704. A base layer 1702 and a curl prevention layer 1701 are provided at the bottom. This embodiment exposes sensitive scent causing agent more heat due to its proximity.

Now referring to FIG. 11B, an alternative embodiment includes the following layers from the top to the bottom. The top layer is placed in contact with or in the vicinity of a thermal activation unit. The top scent leakage prevention layer 1707 prevents scent causing agent from releasing prior to activation. Located underneath the top scent leakage prevention layer 1707 is the heat sensitive colorant layer 1704 which forms an image in response to heat. Under the heat sensitive colorant layer 1704, a binder layer 1705 holds scent causing agents 1706. To stabilize the above described layers, a rear prevention layer 1703 is located below the binder layer 1705. A base layer 1702 and a curl prevention layer 1701 are provided at the bottom. This alternative embodiment exposes more heat to colorant causing due to its proximity for outputting a superior color image.

In another alternative embodiment, the scent causing agents are encapsulated in heat sensitive material. When the capsules are exposed to a predetermined amount of heat, the capsules are broken or dissolved and the scent causing agent is released. In yet another alternative embodiment, the above described order of the layers is reversed in that the heat sensitive colorant layer 1704 and or a layer containing the scent agents are placed the most far away from the top layer. In other words, the heat sensitive colorant layer 1704 and or a layer containing the scent agents are on a side opposite a side carrying an image.

Figure 12A:
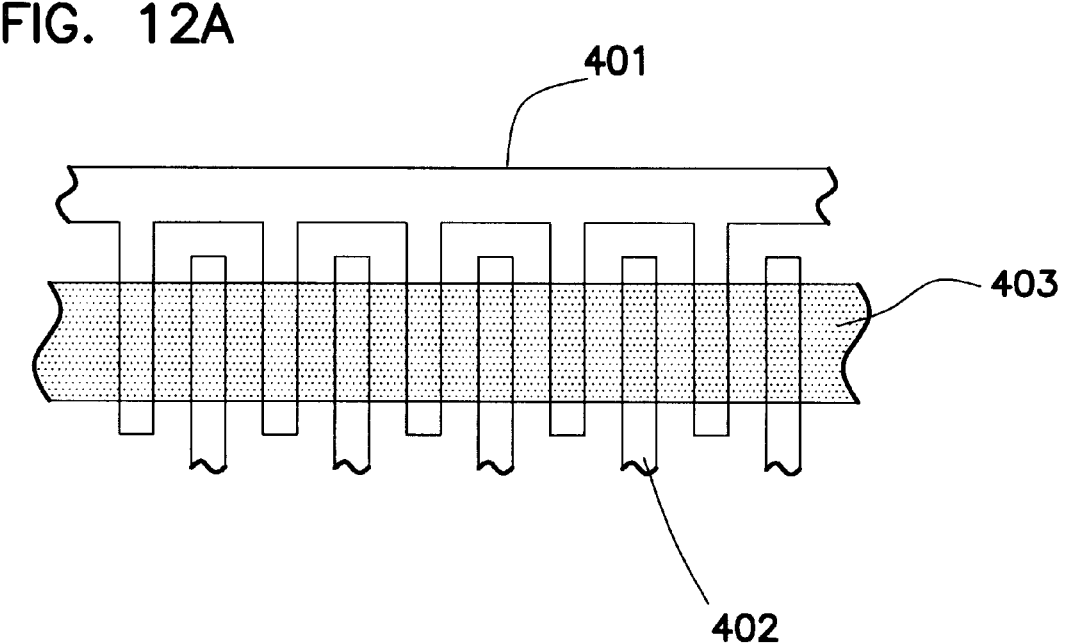
FIGS. 12A and 12B respectively illustrate a top view and a cross sectional view of one example of an output unit or a scent causing unit which is used in the scent generation system of the current invention.
Figure 12B:
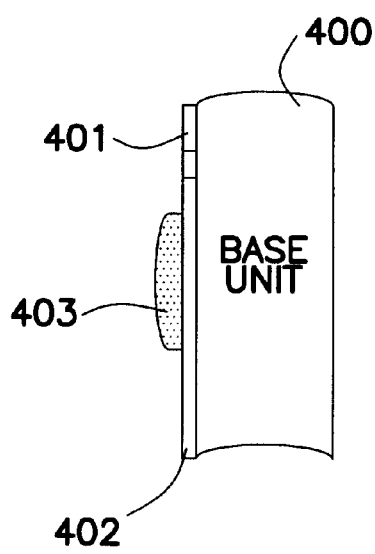

Now referring to FIGS. 12A and 12B, one example of an output unit or a scent causing unit is illustrated. FIG. 7A is a top view of a thermal activation unit which includes a first common electrode 401, a second electrode 402 located near the common electrode 401 and a heat generating element 403 located across the first and second electrodes 401 and 402 for generating a predetermined amount of heat in response to a pulse voltage applied to the electrodes. FIG. 7B is a side view illustrating the thermal activation unit. The electrodes 401, 402 are placed upon a base 400 while the heat generating element 403 is located on top of the electrodes 401, 402. The heat generating element 403 is in contact with or is located near an output carrying medium, and the generated heat dissolves the material which contains scent causing agents and prevents the scent causing agents from released into the air.

Figure 13:
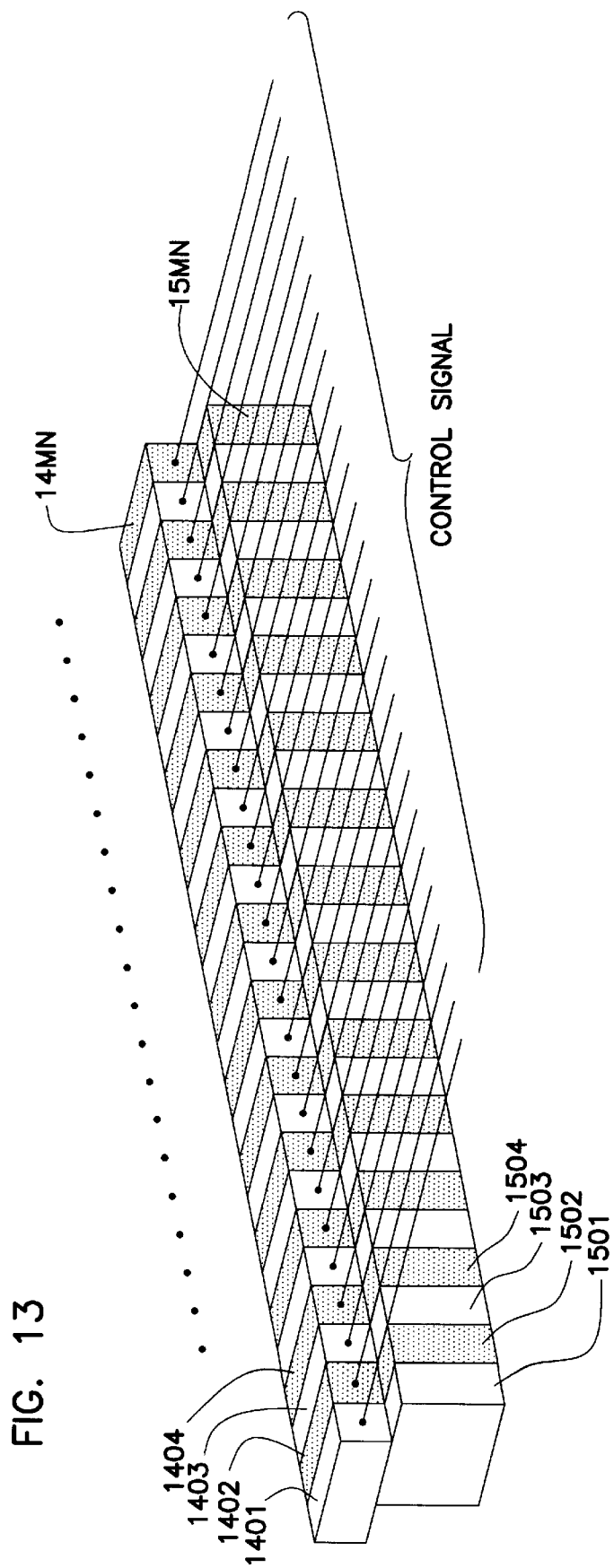
FIG. 13 illustrates a perspective view of another example of an output unit or a scent causing unit which is used in the scent generation system of the current invention.

Referring to FIG. 13, another example of an output unit or a scent causing unit is illustrated. A pair of a scent storage element 1501 and a scent releasing element 1401 generates a scent. The scent storage element 1501 stores a predetermined type of a scent causing agent while the scent releasing element 1401 releases the scent causing agent into the air based upon the control signal. Similar pairs of the scent storage elements 1502 through 150N and corresponding releasing elements 1402 through 140N are adjacently placed for independent scent generation. The scent storage elements 1502 through 150N each contains a predetermined type of scent causing agents. Any combination of these units is simultaneously activated to generate a mixture of the scent causing agents.

Figure 14:
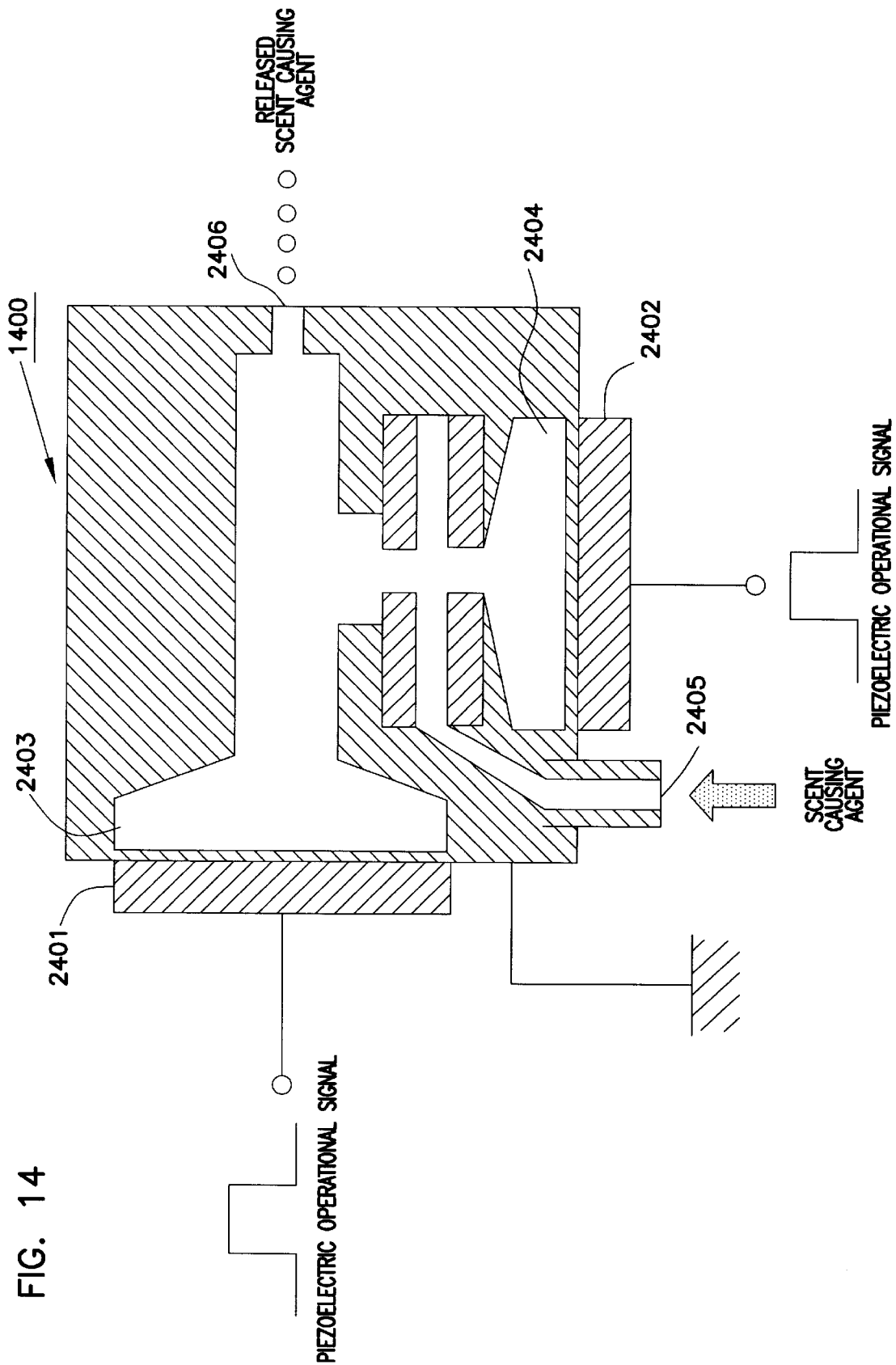
FIG. 14 illustrates a cross sectional view of the example of the output unit as illustrated in FIG. 13 which is used in the scent generation system of the current invention.

Now referring to FIG. 14, one example of the releasing element 1400 is an on-demand type ink jet printer head, and its components include two piezoelectric elements 2401 and 2402 which are respectively located near cavities 2403 and 2404. An input nozzle 2405 is connected to the cavities 2404 for inputting scent causing agent into the cavities. In order to release the scent causing agent, the piezoelectric elements 2401 and 2402 are activated in response to a piezoelectric operational signal or a scent releasing signal. The scent causing agent is released via an output nozzle 2406 into the air and then onto output media such as an image-carrying medium and a scent carrying medium. In fact, an entire surface of the output medium can be uniformly covered by the scent causing agent. As described above, an array of the releasing elements are juxtaposed, and any combination of these units is simultaneously activated to generate a mixture of the scent causing agents.

Figure 15:
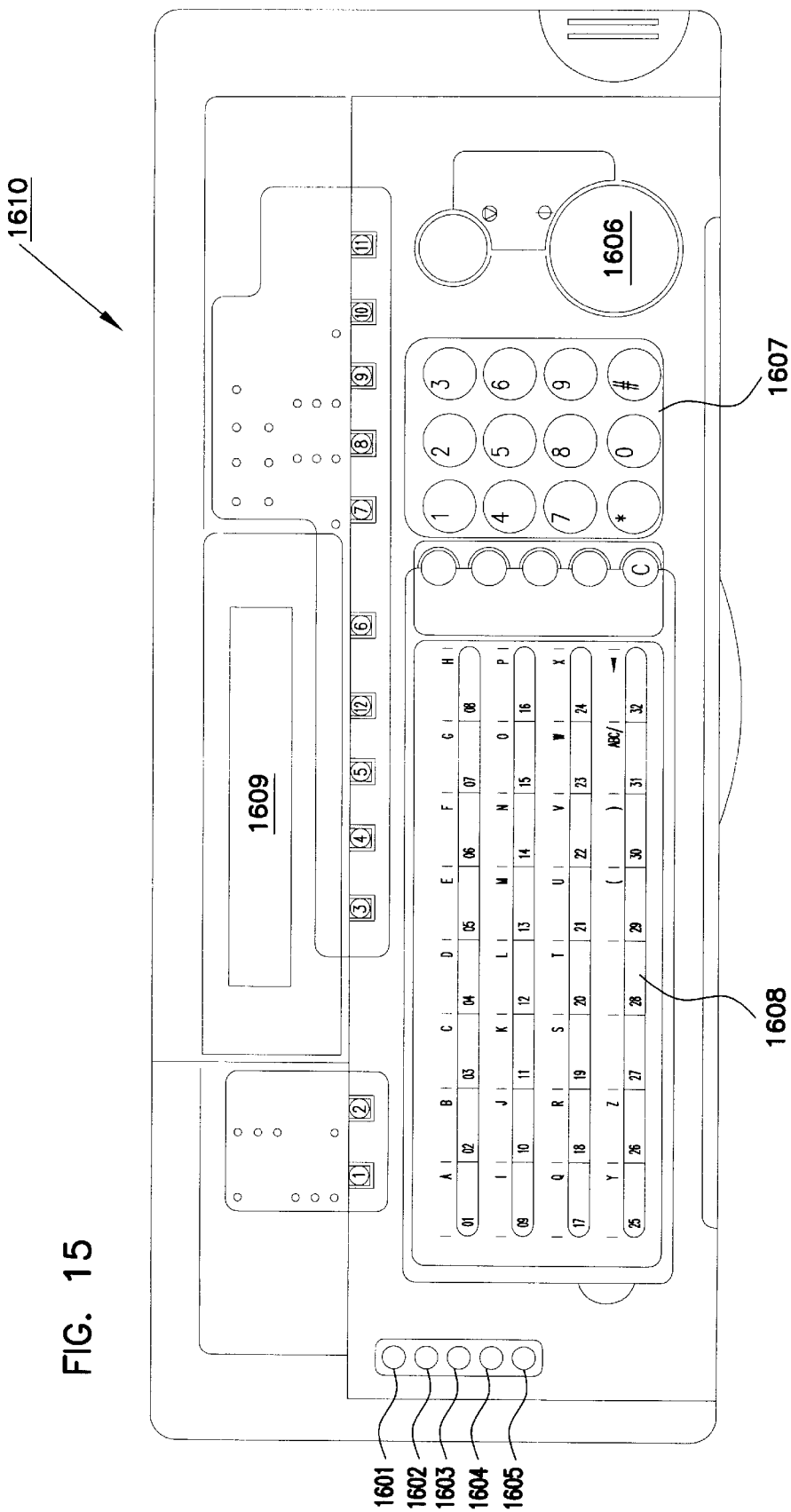
FIG. 15 illustrates an exemplary layout of a scent input unit for the facsimile scent transmission system according to the current invention.

Now referring to FIGS. 15 and 16, in order to specify a scent to be generated, a scent input unit is provided to the facsimile scent transmission system according to the current invention. One preferred embodiment includes a set of scent specification buttons 1601 through 1605 in a control panel unit 1610. Each of the scent specification buttons 1601 through 1605 specifies a corresponding predetermined scent and generates a corresponding scent signal which is temporarily held in a random access memory. After a phone number is inputted by a preset speed dial key 1608 or a numeric key pad 1607, upon pressing a start key 1606, the selected scent signal is transmitted to a destination facsimile machine along with other information. The result of the image and scent transmission is displayed on a display unit 1609. FIG. 16 illustrates an alternative embodiment of the facsimile scent transmission system according to the current invention. In stead of providing a set of separate keys for specifying a scent, the alternative embodiment of the control panel 1611 includes a scent mode button 1602 for specifying the scent mode. In the scent mode, an operator specifies a scent using a predetermined scent code via a numeric key pad 1607.

The above described scent specification input is transmitted as a part of a predetermined protocol from a source transmission unit to a destination transmission unit. FIGS. 17A and 17B illustrate one example of the predetermined protocol. A sending side sends a command S_CAP to a destination side for notifying types of scent causing agents and a combination thereof. In response to the S_CAP command, the receiving side sends a command R_CAP for notifying types of scent causing agents and a combination thereof. FIG. 17B illustrates one exemplary format of the S_CAP and R_CAP commands includes a command name in the first and second bytes and a one-bit support indication for each of predetermined scent generation unit type from the third byte on. For example, the support types include a thermal capsule type, a mechanical release type, an ink jet type and etc. After the scent generation support type is established, the sending side sends a command S_CONT_D to the receiving side to indicate which scent is to be generated at the receiving side. The receiving side then sends back a confirmation command S_CONT_D(OK) to the sending side. At this point, the sending side and the receiving side once more handshake by exchanging a pair of commands S_D_TRAN and S_D_TRAN(OK) for confirming a operational transmission status prior to transmitting data. The above described independent protocol is used for G3 and G4 facsimile machines.

Figure 19:
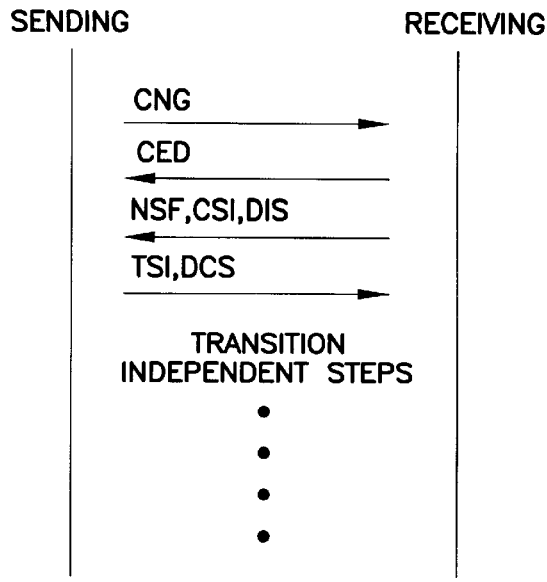
FIGS. 19 and 20 respectively illustrate a transition protocol for the G3 and G4 facsimile transmission protocols used by the scent generation system according to the current invention.
Figure 20:
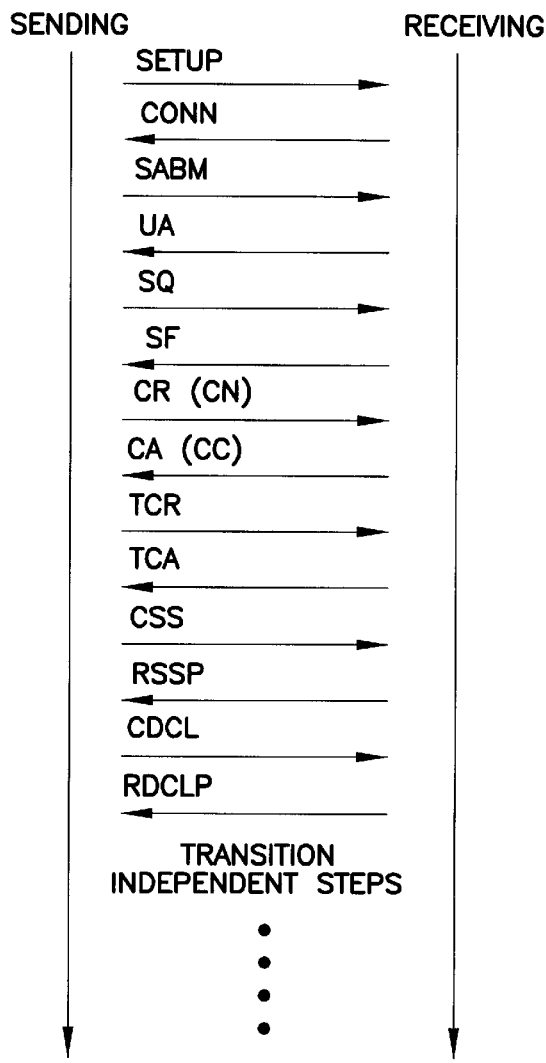

FIGS. 18A and 18B respectively illustrate the above described independent scent transmission protocol in relation to the predetermined G3 and G4 fax protocols. FIGS. 19 and 20 respectively illustrate a part of the G3 and G4 protocols that is executed prior to the above described scent generation related protocol. Since the G3 and G4 protocols are well in the relevant prior art, only the relation to the scent generation related protocol is described herein. Referring to FIG. 18A, after a sending side sends a command TSI, DCS to a receiving side, the transition protocol as illustrated in FIG. 19 is executed during a transition to the above described scent generation related protocol. For the G4 protocol, after a sending side received a command RDCLP, the transition protocol as illustrated in FIG. 20 is executed during a transition to the above described scent generation related protocol.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. An image-carrying medium having a first side, a second side and edges, comprising:

an image-carrying area for carrying an image reproduced based upon digital data; and a plurality of independent sources of scent-causing agents, each of said independent sources being independently activated for generating a predetermined scent.

2. The image-carrying medium according to claim 1 wherein said independent sources are located in said image-carrying area.

3. The image-carrying medium according to claim 1 wherein said independent sources are located outside said image-carrying area.

4. The image-carrying medium according to claim 3 wherein said independent sources are located near the edges.

5. The image-carrying medium according to claim 1 wherein said independent sources and said image-carrying area are located on the first side.

6. The image-carrying medium according to claim 1 wherein said independent sources are located on the first side while said image-carrying area is located on the second side.

7. The image-carrying medium according to claim 1 wherein said independent sources are simultaneously activated for causing a mixture of predetermined scents.

8. The image-carrying medium according to claim 1 wherein each of said independent sources further comprises micro-capsules containing said scent-causing agents.

9. The image-carrying medium according to claim 1 wherein colorant is to be deposited on said image-carrying area so as to form said image.

10. The image-carrying medium according to claim 1 wherein said image carrying medium includes at least one layer of colorant capable of forming an image.

11. The image-carrying medium according to claim 1 wherein said scent-causing agents are each pressure sensitive for generating said predetermined scent.

12. The image-carrying medium according to claim 1 wherein said scent-causing agents are each heat sensitive for generating said predetermined scent.

13. A system for generating a scent, comprising:
   a scent control unit for generating a scent signal which specifies a scent to be generated;
   a dry scent-carrying medium carrying an image reproduced according to digital data on its surface and said dry scent-carrying medium containing a plurality of independently releasable sources of scent-causing agents, each of said sources causing a predetermined scent; and
   a scent causing unit located near said dry scent-carrying medium and in response to said scent signal from said scent control unit for selectively releasing said scent-causing agents from said dry scent-carrying medium so as to generate said scent.

14. The system for generating a scent according to claim 13 wherein said dry scent-carrying medium further includes a colorant.

15. The system for generating a scent according to claim 13 wherein said scent signal is indicative of simultaneously releasing a combination of said sources of said scent-causing agents.

16. The system for generating a s cent according to claim 13 wherein said scent-causing agents are each pressure sensitive for generating said predetermined scent.

17. The system for generating a scent according to claim 13 wherein said scent-causing agents are each heat sensitive for generating said predetermined scent.

18. The system for generating a scent according to claim 13 wherein said scent control unit is remotely located from said scent causing unit.

19. A facsimile for transmitting an image and a scent, comprising:
   an image control unit for generating an image signal which specifies the image to be transmitted;
   a scent control unit for generating a scent signal which specifies the scent to be transmitted;
   an output-carrying medium capable of carrying an image and containing a plurality of independently releasable sources of scent-causing agents, each of said sources causing a predetermined scent; and
   an output unit located near said output-carrying medium and in response to said scent signal and said image signal for generating said image on said output-carrying medium and for selectively releasing said scent-causing agents from said output-carrying medium so as to generate said scent.

20. The facsimile according to claim 19 wherein said scent signal is indicative of simultaneously releasing a combination of said sources of said scent-causing agents.

21. The facsimile according to claim 19 wherein said scent-causing agents are each pressure sensitive for generating said predetermined scent.

22. The facsimile according to claim 19 wherein said scent-causing agents are each heat sensitive for generating said predetermined scent.

23. The facsimile according to claim 19 wherein said scent control unit further comprises an scent specifying input unit for inputting a scent input.

24. The facsimile according to claim 19 wherein said image signal and said scent signal are combined as an output signal.

25. The facsimile according to claim 19 wherein said output-carrying medium is heat sensitive to generate said image and said scent, said output unit generating heat based upon said image signal and said scent signal.

26. The facsimile according to claim 19 wherein said output-carrying medium is pressure sensitive to generate said image and said scent, said output unit generating pressure based upon said image signal and said scent signal.

27. The facsimile according to claim 19 wherein said output unit generates said image by depositing colorant on said output-carrying medium based upon said image signal.

28. A method of generating a scent from an image-carrying medium, the image-carrying medium having a first side, a second side and edges, the first side further including an image-carrying area, comprising the steps of:
   providing a plurality of independent sources of scent-causing agents on the image-carrying medium, each of said independent sources being independently activated for generating a predetermined scent;
   rendering an image on the first side of said image-carrying medium; and
   selectively releasing said scent-causing agents from said image-carrying medium so as to generate the scent.

29. The method of generating a scent according to claim 28 wherein said independent sources are provided in said image-carrying area.

30. The method of generating a scent according to claim 28 wherein said independent sources are provided outside said image-carrying area.

31. The method of generating a scent according to claim 28 wherein said independent sources are provided near the edges.

32. The method of generating a scent according to claim 28 wherein said independent sources are provided on the first side.

33. The method of generating a scent according to claim 28 wherein said independent sources are provided on the second side.

34. The method of generating a scent according to claim 28 wherein said independent sources are simultaneously activated for causing a mixture of predetermined scents.

35. The method of generating a scent according to claim 28 wherein said scent-causing agents are simultaneously released as said image is rendered.

36. The method of generating a scent according to claim 28 wherein said scent-causing agents are later released after said image is rendered.

37. The method of generating a scent according to claim 28 wherein said rendering step further comprising a step of depositing colorant on said image-carrying area so as to form said image.

38. The method of generating a scent according to claim 28 wherein said rendering step further comprising a step of generating heat so as to form said image.

39. The method of generating a scent according to claim 28 wherein said selectively releasing step further comprising a step of generating pressure so as to generate said predetermined scent.

40. The method of generating a scent according to claim 28 wherein said selectively releasing step further comprising a step of generating heat so as to generate said predetermined scent.

41. A method of generating a scent, comprising the steps of:
   generating a scent signal which specifies the scent to be generated;
   providing at least one colorant and a plurality of independently releasable sources of scent-causing agents on a dry scent-carrying medium, each of said sources causing a predetermined scent;
   selectively releasing said scent-causing agents from the dry scent-carrying medium based upon said scent signal so as to generate said scent and transferring said colorant from the dry scent-carrying medium so as to generate an image.

42. The method of generating a scent according to claim 41 further comprising a step of generating an image on the dry scent-carrying medium.

43. The method of generating a scent according to claim 41 wherein said selectively releasing step simultaneously releases a combination of said sources of said scent-causing agents.

44. The method of generating a scent according to claim 41 wherein said selectively releasing step generates pressure for generating said predetermined scent.

45. The method of generating a scent according to claim 41 wherein said selectively releasing step generates heat for generating said predetermined scent.

46. The method of generating a scent according to claim 41 wherein said scent signal is remotely generated.

47. A method of transmitting an image and a scent, comprising:
   generating an image signal which specifies the image to be transmitted;
   generating a scent signal which specifies the scent to be transmitted;
   providing an output-carrying medium which is capable of carrying an image and contains a plurality of independently releasable sources of scent-causing agents, each of said sources causing a predetermined scent;
   generating said image on said output-carrying medium in response to said image signal; and
   selectively releasing said scent-causing agents from said output-carrying medium so as to generate said scent in response to said scent signal.

48. The method of transmitting an image and a scent according to claim 47 wherein said selectively releasing step simultaneously releases a combination of said sources of said scent-causing agents.

49. The method of transmitting an image and a scent according to claim 47 wherein said selectively releasing step further includes a step of generating pressure for generating said predetermined scent.

50. The method of transmitting an image and a scent according to claim 47 wherein said selectively releasing step further includes a step of generating heat for generating said predetermined scent.

51. The method of transmitting an image and a scent according to claim 47 further comprises an additional step of inputting a scent-specifying input.

* * * * *